United States Patent [19]

Paleari et al.

[11] Patent Number: 6,110,570
[45] Date of Patent: Aug. 29, 2000

[54] MULTILAYER HEAT-SHRINKABLE FILMS WITH IMPROVED MECHANICAL PROPERTIES

[75] Inventors: Mario Paleari, Pogliano Milanese; Tito Fornasiero, Rho, both of Italy

[73] Assignee: Cryovac, Inc., Duncan, S.C.

[21] Appl. No.: 08/545,127

[22] Filed: Oct. 18, 1995

[51] Int. Cl.⁷ .............................. B23B 27/30; B23B 27/32
[52] U.S. Cl. ...................... 428/213; 428/34.9; 428/349; 428/355 EN; 428/516; 428/518; 428/520; 428/910
[58] Field of Search ................................. 428/515, 516, 428/213, 332, 518, 522, 910, 520, 355 EN, 355 AC, 349, 35.4, 34.9

[56] References Cited

U.S. PATENT DOCUMENTS

| | | | |
|---|---|---|---|
| 4,247,584 | 1/1981 | Widiger et al. | 428/35 |
| 4,424,243 | 1/1984 | Nishimoto et al. | 428/36 |
| 4,457,960 | 7/1984 | Newsome | 428/35 |
| 4,532,189 | 7/1985 | Mueller | 428/516 |
| 5,037,683 | 8/1991 | Schirmer | 428/36.7 |
| 5,059,481 | 10/1991 | Lustig et al. | 428/39.9 |
| 5,206,075 | 4/1993 | Hodgson, Jr. | 428/216 |
| 5,241,031 | 8/1993 | Mehta | 526/348.1 |
| 5,272,236 | 12/1993 | Lai et al. | 526/348.5 |
| 5,278,272 | 1/1994 | Lai et al. | 526/348.5 |
| 5,279,872 | 1/1994 | Ralph | 428/34.9 |
| 5,397,613 | 3/1995 | Goergelos | 428/36.7 |
| 5,397,640 | 3/1995 | Georgelos et al. | 428/349 |
| 5,403,668 | 4/1995 | Wilhoit | 428/500 |
| 5,427,807 | 6/1995 | Chum et al. | 426/393 |

FOREIGN PATENT DOCUMENTS

| | | |
|---|---|---|
| 0229715 | 7/1987 | European Pat. Off. . |
| 0285444 | 10/1988 | European Pat. Off. . |
| 0577432 | 1/1994 | European Pat. Off. . |
| 2115348 | 2/1982 | United Kingdom . |
| 2135239 | 2/1983 | United Kingdom . |
| WO 90/03414 | 4/1990 | WIPO . |
| WO 93/03093 | 2/1993 | WIPO . |

OTHER PUBLICATIONS

Encyclopedia of Polymer Science and Engineering, vol. 6, pp. 421–423.
Schut "Enter a New Generations of Polyolefins" Plastic Technology, pp. 15–17, Nov. 1991.
Surlyn Product Guide, DuPont Compny, Wllmington DE, pp. 1–9, Aug. 1994.
Article—Encyclopedia of Polymer Science and Engineering, vol. 6, pp. 421–423, 1985.
Article—Michael and Irene Ash, "Handbook of Plastic Compounds, Elastomers and Resins", VCH Publishers, p. 117, 1992.

*Primary Examiner*—Paul Thibodeau
*Assistant Examiner*—D. Lawrence Tarazano
*Attorney, Agent, or Firm*—Rupert B. Hurley, Jr.

[57] ABSTRACT

A multilayer heat-shrinkable film comprises
  a heat-sealable layer (a);
  an inner layer (b) comprising a polymer selected from the group consisting of ethylene-vinyl acetate copolymers containing from 4 to 28% by weight of vinyl acetate units and with a fractional Melt Index, and ethylene-alkyl acrylate copolymers containing from 9 to 28% by weight of alkyl acrylate units and with a fractional Melt Index;
  an inner layer (c), face-to-face in contact with layer (b), comprising a polymer selected from the group consisting of ethylene-acrylic acid copolymers, ethylene-methacrylic acid copolymers, ethylene-vinyl acetate copolymers, ethylene-alkyl acrylate copolymers, heterogeneous ethylene-α-olefin copolymers, and homogeneous ethylene-α-olefin copolymers; and
  an additional layer (d) comprising a polymer selected from the group consisting of ethylene-vinyl acetate copolymers containing from 4 to 28% by weight of vinyl acetate units and with a fractional Melt Index, and ethylene-alkyl acrylate copolymers containing from 9 to 28% by weight of alkyl acrylate units and with a fractional Melt Index; face-to-face in contact with the side of layer (c) which is not in contact with layer (b);
  wherein the composition of layer (c) is different from that of layer (b) and (d), and the ratios by weight between layer (b) and layer (c), and between layer (d) and layer (c) are comprised between 0.125 to 1 and 8 to 1.

The heat-shrinkable films according to the invention have very good mechanical properties such as puncture resistance, high shrink and good optical properties which render them particularly suitable for e.g. packaging of frozen foods.

21 Claims, No Drawings

MULTILAYER HEAT-SHRINKABLE FILMS WITH IMPROVED MECHANICAL PROPERTIES

The present invention relates generally to thermoplastic, heat-shrinkable, packaging films and more particularly to a multilayer heat-shrinkable film with high shrink, good optical properties and improved mechanical properties particularly suitable for packaging food products.

Heat-shrinkable thermoplastic films have found many useful applications in the packaging industry for food (meat, cheeses, poultry, etc.) and non-food products.

In general terms, the packaging of food and non-food items by means of a heat-shrinkable thermoplastic film comprises configuring the heat-shrinkable packaging material, either partially or completely, around a product (e.g. by placing the article within a bag fabricated from the film), removing excess air from inside the package (e.g. vacuumizing the bag), sealing it and thereafter exposing the package to a heat source thereby causing the heat-shrinkable film to shrink and conform with the contours of the packaged item.

These films should provide to the packaged items an attractive appearance and in the mean time have good mechanical properties which would guarantee that the packaged product would be protected from the environment.

The attractive appearance is mainly dependent on the optics and on the shrink properties of the film.

As a matter of fact the transparency, clarity and glossiness of the film do contribute to the aesthetic consumer appeal of products packaged therein. Good optical properties also permit adequate inspection of the packaged product during the distribution cycle and by the end user at the point of purchase.

The shrink properties which depend on the shrink characteristics of the materials used and are imparted to the film by the process used for its manufacture also contribute to the attractive package appearance providing a tight, smooth appearance to the packaged article. Processes useful for the manufacture of films for food contact applications involve an orientation step carried out by heating the cast material at a temperature that is below the melting temperature of at least one polymer present in the film, such temperature being generally below 100° C., and preferably between 80 and 95° C. Once used in packaging, the thus obtained film, heated to a temperature close to its orientation temperature, will shrink back to its original unoriented dimension.

Further desirable properties, particularly in case of a film to be used for packaging of rigid and tough articles, such as frozen food, both in case the food is packaged in the fresh state and then frozen and in case the food is packaged directly in the frozen state, are high mechanical properties which are required to avoid that the article packaged, which may often have projections, might puncture and damage the film. Furthermore, owing to the longer shelf-life of the frozen foods, their distribution chain do often comprise more steps than for fresh foods which have a limited shelf-life and therefore the packaging material needs to be strong enough to survive the handling involved in these several steps.

SUMMARY OF THE INVENTION

The present invention provides a multilayer film which has very good mechanical properties such as puncture resistance and abuse resistance, high shrink at low temperature and good optical properties.

Specifically the present invention relates to a multilayer heat-shrinkable film comprising:

a heat-sealable layer (a);

an inner layer (b) comprising a polymer selected from the group consisting of ethylene-vinyl acetate copolymers containing from 4 to 28% by weight of vinyl acetate units and with a fractional Melt Index, and ethylene-alkyl acrylate copolymers containing from 9 to 28% by weight of alkyl acrylate units and with a fractional Melt Index;

an inner layer (c), face-to-face in contact with layer (b), comprising a polymer selected from the group consisting of ethylene-acrylic acid copolymers, ethylene-methacrylic acid copolymers, ethylene-vinyl acetate copolymers, ethylene-alkyl acrylate copolymers, heterogeneous ethylenes-α-olefin copolymers, and homogeneous ethylene-α-olefin copolymers; and an additional layer (d) comprising a polymer selected from the group consisting of ethylene-vinyl acetate copolymers containing from 4 to 28% by weight of vinyl acetate units and with a fractional Melt Index, and ethylene-alkyl acrylate copolymers containing from 9 to 28% by weight of alkyl acrylate units and with a fractional Melt Index; face-to-face in contact with the side of layer (c) which is not in contact with layer (b);

wherein the composition of layer (c) is different from that of layers (b) and (d), and the ratios by weight between layer (b) and layer (c), and between layer (d) and layer (c) are comprised between 0.125 to 1 and 8 to 1.

In a preferred embodiment the present invention relates to a multilayer heat-shrinkable film as above wherein the inner layers (b) and (d), each independently, comprise a polymer selected from ethylene-vinyl acetate copolymers containing from 4 to 28% by weight of vinyl acetate units and with a fractional Melt Index.

In a more preferred embodiment the present invention refers to a multilayer heat-shrinkable film as above wherein the inner layers (b) and (d), each independently, comprise an ethylene-vinyl acetate copolymer containing from 9 to 19% by weight of vinyl acetate units and with a fractional Melt Index, and the inner layer (c), which is face-to-face in contact with layers (b) and (d), comprises a polymer selected from ethylene-acrylic acid copolymers, and ethylene-methacrylic acid copolymers.

Test results show that films according to the present invention have very good shrink, optical and mechanical properties which render them particularly suitable for e.g. packaging of frozen foods.

DETAILED DESCRIPTION

The heat-shrinkable films according to the present invention possess at least four layers of thermoplastic materials: one layer, layer (a), is an outer layer and is termed heat-sealable layer; layers (b) and (c) are inner layers as they are not outer or skin layers of the multilayer structure according to the present invention; while layer (d) may be an outer or skin layer in case of a four layer structure, but it can also be an inner layer in case at least one additional polymeric layer is incorporated into the film in face-to-face contact with said layer (d). It is to be understood that additional polymeric layers might also be incorporated into the film between the heat-sealing layer (a) and the inner layer (b).

In this specification and the accompanying claims:

The term "film" refers to a flat or tubular flexible structure of thermoplastic material having a thickness up to about 150 $\mu$.

The term "heat-shrinkable" refers to a film which shrinks by at least 15% of its original dimensions, in at least one of the longitudinal and transverse directions, when heated to 90° C. for 4 seconds. The quantitative determination is carried out according to ASTM D 2732, as set forth in the 1990 Annual Book of ASTM Standards, Vol. 08.02, pp. 368–371.

As used herein, the phrase "longitudinal direction" or "machine direction," herein abbreviated "MD", refers to a direction "along the length" of the film, i.e., in the direction of the film as the film is formed during extrusion and/or coating.

As used herein, the phrase "transverse direction," herein abbreviated "TD," refers to a direction across the film, perpendicular to the machine direction.

The term "fractional Melt Index" refers to a Melt Index lower than 1, wherein the Melt Index is measured according to ASTM D-1238, Condition E, at 190° C. and reported as grams per 10 minutes.

As used herein, the phrases "sealing layer", "heat-sealable layer" and "heat sealing layer", refer to an outer film layer, or layers, involved in the sealing of the film to itself, another film layer of the same or another film, and/or another article which is not a film.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the outer layers of the multilayer film. "Outside layer" also is used with reference to the outermost layer of a plurality of concentrically arranged layers simultaneously coextruded through an annular die.

As used herein, the term "adhered" is inclusive of films which are directly adhered to one another using a heat seal or other means, as well as films which are adhered to one another using an adhesive applied between the two films.

As used herein, the phrase "directly adhered," as applied to film layers, is defined as adhesion of the subject film layer to the object film layer, without a tie layer, adhesive, or other layer there between. In such a case, the phrase "face-to-face contact" between the layers directly adhered to is conveniently employed throughout the specification. In contrast, as used herein, the word "between," as applied to a film layer expressed as being between two other specified layers, includes both direct adherence of the subject layer to the two other layers the subject layer is between, as well as including a lack of direct adherence to either or both of the two other layers the subject layer is between (i.e., one or more additional layers can be imposed between the subject layer and one or more of the layers the subject layer is between).

As used herein, the term "homopolymer" is used with reference to a polymer resulting from the polymerization of a single monomer, i.e., a polymer consisting essentially of a single type of repeating unit, while the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, 1-butene, 1-hexene, and 1-octene.

The term "polymer" is inclusive of "homopolymers" and "copolymers" as defined above.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER™ linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "homogeneous polymer" refers to polymerization reaction products of relatively narrow molecular weight distribution and relatively narrow composition distribution.

Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, modified polymers thereof, and the like. Specific examples include polyethylene homopolymer, polypropylene homopolymer, polybutene, ethylene-$\alpha$-olefin copolymer, propylene-$\alpha$-olefin copolymer, butene-$\alpha$-olefin copolymer, ethylene-vinyl acetate copolymer, ethylene-ethyl acrylate copolymer, ethylene-butyl acrylate copolymer, ethylene-acrylic acid copolymer, ethylene-methacrylic acid copolymer, modified polyolefin resin, ionomer resin, polymethylpentene, etc.

Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating, into the olefin homopolymer or copolymer, an unsaturated carboxylic acid, e.g. maleic acid, fumaric acid, or the like, or a derivative thereof such as the anhydride, ester or metal salt or the like.

Examples of said modified polyolefins are graft copolymers of maleic acid or anhydride onto ethylene-vinyl acetate copolymers, graft copolymers of fused ring carboxylic anhydrides onto polyethylene, resin mixtures of these and mixtures with polyethylene or ethylene-$\alpha$-olefin copolymers.

As used herein, the phrase "ethylene-$\alpha$-olefin copolymer," is inclusive of a diverse group of polyethylene copolymers. More specifically, this phrase encompasses such heterogeneous materials as linear low density polyethylene (LLDPE), very low and ultra low density polyethylene (VLDPE and ULDPE), as well as homogeneous polymers such as metallocene-catalyzed EXACT™ linear homogeneous ethylene-α-olefin copolymer resins obtainable from the Exxon Chemical Company, of Baytown, Tex., and TAFMER™ linear homogeneous ethylene-α-olefin copolymer resins obtainable from the Mitsui Petrochemical Corporation. Other ethylene-α-olefin copolymers, such as long chain branched homogeneous ethylene-α-olefin copolymers available from The Dow Chemical Company, known as AFFINITY™ resins, are also included as another type of homogeneous ethylene-α-olefin copolymer useful in the present invention.

The term "ethylene-acrylic acid and ethylene-methacrylic acid copolymers" refers to copolymers of ethylene with a copolymerisable ethylenically unsaturated carboxylic acidic monomer selected from acrylic acid and methacrylic acid. The copolymer typically contains from about 4 to about 18% by weight of acrylic or methacrylic acid units. Said copolymer can also contain, copolymerized therein an alkyl acrylate or methacrylate, such as n-butyl acrylate or methacrylate or isobutyl acrylate or methacrylate. Said copolymer can be in the free acid form as well as in the ionized or partially ionized form wherein the neutralizing cation can be any suitable metal ion, e.g. an alkali metal ion, a zinc ion or other multivalent metal ions; in this latter case the copolymer is also termed "ionomer".

Unless otherwise specifically indicated, as used herein the term "ethylene-vinyl acetate copolymer" or "EVA" is intended to refer to a copolymer formed from ethylene and vinyl acetate monomers wherein the ethylene derived units in the copolymer are present in major amounts; preferably between about 60% and 98% by weight and the vinyl acetate derived units in the copolymer are present in minor amounts, preferably between about 2% and about 40% by weight. Unless otherwise specifically indicated, the Melt Index of said copolymers is not limited to <1.0 g/10'.

As used herein the term "ethylene-alkyl acrylate copolymers" refers to copolymers of ethylene with alkyl acrylates, e.g. methyl acrylate, ethyl acrylate, and butyl acrylate, wherein the ethylene derived units in the copolymer are present in major amounts and the alkyl acrylate derived units in the copolymer are present in minor amounts, preferably between about 2% and about 28% by weight. Also in this case, unless otherwise specifically indicated, the term is intended to refer to ethylene-alkyl acrylate copolymers with a Melt Index that can be fractional or $\geq 1$ g/10'.

The term PVDC refers to a vinylidene chloride copolymer wherein a major amount of the copolymer comprises vinylidene chloride and a minor amount of the copolymer comprises one or more unsaturated monomers copolymerizable therewith, typically vinyl chloride, and alkyl acrylates (e.g. methyl acrylate) or to a blend thereof in different proportions. Generally said PVDC will contain plasticisers and/or stabilizers as known in the art.

The term EVOH refers to saponified products of ethylene-vinyl ester copolymers, generally of ethylene-vinyl acetate copolymers, wherein the ethylene content is typically comprised between 20 and 60% by mole and the degree of saponification is generally higher than 85%, preferably higher than 95%.

As used herein, the term polyamide is intended to refer to both polyamides and co-polyamides, either aliphatic or aromatic. Suitable polyamides include amorphous polyamides, and those polymers commonly referred to as e.g. nylon 6, nylon 66, nylon 6–66, nylon 610, nylon 12, nylon 69, and nylon 6–12, as well as to any blend thereof.

For the purposes of the present invention the term polyesters also includes co-polyesters, and polyether/polyesters (i.e. block co-polymers), such as those products obtained by copolymerisation of typically aromatic di-carboxylic acids, such as isophthalic acid and, preferably, terephthalic acid, with one or more glycols, such as ethylene glycol, butylene glycol, and cyclohexanedimethanol.

In the films according to the present invention the heat-sealable layer (a) may be any conventional heat-sealable layer. Such a layer may for example comprise VLDPE (heterogeneous ethylene-($C_4$–$C_8$)-α-olefin copolymer having a density $\leq 0.915$ g/cc), LLDPE (heterogeneous ethylene-($C_4$–$C_8$)-α-olefin copolymer having a density >0.915 g/cc), single-site or metallocene-catalysed homogeneous ethylene-α-olefin copolymer (i.e. ethylene-($C_4$–$C_8$)-α-olefin copolymer characterized by a narrow composition distribution and a narrow molecular weight distribution and by the method of manufacture which involves the use of a homogeneous so-called metallocene or single-site catalyst), an ethylene-propylene copolymer, an ethylene-propylene-butylene copolymer, an ethylene-acrylic or methacrylic acid copolymer including an ionomer, and the like. Blends of polymers with good heat-sealing properties can also be used.

In a preferred embodiment the heat-sealable layer (a) will comprise VLDPE or a single-site ethylene-alpha-olefin copolymer such as those described for example in WO 93/03093, U.S. Pat. Nos. 5,206,075, 5,241,031, WO 90/03414, U.S. Pat. Nos. 5,272,236, and 5,278,272.

When layers (b) and/or (d) comprise an ethylene-vinyl acetate copolymer, preferably the amount by weight of the vinyl acetate units is comprised between 4 to 28%, more preferably between 9 and 19% and even more preferably between 11 and 15%. The fractional Melt Index is preferably <0.5 g/10 min., more preferably <0.40 g/10 min., and most preferably $\leq 0.35$ g/10 min.

The ethylene-alkyl acrylate copolymers of layers (b) and (d), are preferably ethylene-methyl acrylate copolymers containing from 9 to 28% by weight of methyl acrylate units (more preferably, 11 to 15%, and still more preferably, from 12 to 14%), or ethylene-butyl acrylate copolymers containing from 9 to 24% by weight of butyl acrylate units. The fractional Melt Index of said ethylene-alkyl acrylate copolymers is preferably <0.7 g/10 min., more preferably, <0.50 g/10 min., still more preferably $\leq 0.35$ g/10 min.

The ethylene-vinyl acetate or ethylene-alkyl acrylate copolymers of layers (b) and (d) may be equal or different, provided they both contain an amount by weight of vinyl acetate and/or alkyl acrylate units, respectively, in the above ranges and have a fractional Melt Index.

Preferred ethylene-acrylic acid and ethylene-methacylic acid copolymers for inner layer (c) will contain at least 8% by weight of acrylic or methacrylic acid units and more preferably from about 10 to about 14% by weight.

Preferred ethylene-vinyl acetate and ethylene-alkyl acrylate copolymers for layer (c) will contain an amount of vinyl acetate and alkyl acrylate derived units higher than 18%.

For use in layer (c), heterogeneous ethylene-α-olefin copolymers will preferably have a density higher than 0.905 g/cc and more preferably higher than 0.912 g/cc, while homogeneous ethylene-α-olefin copolymers will preferably have a density higher than 0.900 g/cc and more preferably higher than 0.905 g/cc.

For use in inner layer (c), the polymers will preferably have a Melt Index not higher than 3.0 g/10', more preferably not higher than 2.0 g/10', and even more preferably not higher than 1.0 g/10'.

The ratios by weight between layers (b) and (c) and between layers (d) and (c), which—as indicated above—may be in the range 0.125 to 8, in a preferred aspect are in the range 0.25 to 4, and in a most preferred aspect are in the range 0.5 to 2. For the sake of clarity said ratios need not to be the same and the ratio by weight between layers (b) and (c) may be different from the ratio by weight between layers (d) and (c).

While additional layers may be present following, in the structure sequence, layer (d), in a preferred embodiment of the present invention, layer (a) is in contact face-to-face with layer (b).

The additional layers that may follow layer (d) in the structure sequence, may include, typically as an inner layer in the multilayer structure, an oxygen barrier layer. The oxygen barrier layers may be made of any of the known barrier polymeric resins, such as PVDC, EVOH, PVOH, PA, etc.

When a high oxygen barrier layer is required, preferably said barrier layer is PVDC or EVOH. The EVOH can be employed as such or blended with other EVOH's or with one or more polyamides.

When a medium oxygen barrier layer or a selective $CO_2/O_2$ barrier layer is required, a polyamide, a blend of different polyamides or a blend of one or more polyamides with EVOH, can suitably be employed.

For some of the end applications, such as for frozen food packaging, which is a particularly interesting type of application for the claimed structures, no barrier layer is generally required. "Barrier-less" structures represent therefore a preferred embodiment of the present invention.

The resins used in the manufacture of the films according to the present invention can contain additives as known in the art in order to improve the properties of the film or the manufacturing process thereof. As an example the resins may contain stabilizers, anti oxidants, pigments, U.V. absorbers, etc.

In particular the outer layers may comprise slip and anti-blocking agents as conventionally used in this field.

The maximum number of layers in the structures according to the present invention will only depend on the equipment available for the manufacture thereof. While up to 10 layers in the overall structure can be easily devised on the basis of the commonly available manufacturing lines, in practice structures with up to 7, 8 or 9 layers will be preferred.

Thermoplastic resins which can suitably be employed in these optional additional layers, besides the oxygen barrier materials already indicated, comprise polyolefins, and in particular heterogeneous ethylene-α-olefin copolymers, homogeneous (TAFMER™ homogeneous ehtylene-alpha-olefin or single-site) ethylene-α-olefin copolymers, ethylene-vinyl acetate copolymers, ethylene acrylic acid copolymers, ethylene-methacrylic acid copolymers, ethylene-alkyl acrylate copolymers, and the like, including also blends thereof. Also modified polyolefins or blends of said modified polyolefins with other polyolefins can be employed particularly when said additional layers are inner layers, as they will act as tie layers to aid adhesion of adjacent layers of the film.

A preferred embodiment of the present invention provides for a structure having at least five layers, wherein an outer layer (e) follows layer (d).

Said layer (e) will generally comprise a polymer selected from ethylene-vinyl acetate copolymers, ethylene-alkyl acrylate copolymers, ethylene-acrylic or methacrylic acid copolymers either in free acid or ionized form, heterogeneous ethylene-α-olefin copolymers, such as LLDPE or VLDPE, and homogeneous ethylene-α-olefin copolymers.

When an ethylene-vinyl acetate copolymer is used for said outer layer (e), the % by weight of vinyl acetate units is preferably comprised between 9 and 19. Also, said ethylene-vinyl acetate copolymer for the outer layer (e) may have a Melt Index >1 even if a fractional Melt Index is generally preferred.

In a preferred aspect, layer (e) comprises an ethylene-vinyl acetate copolymer or a heterogeneous or homogeneous ethylene-α-olefin copolymer.

A further preferred embodiment of the present invention provides for a structure containing at least six layers wherein two additional layers are added to the layer sequence (a) to (d) an inner layer (f) in contact face-to-face with layer (d) and a layer (g), in contact face-to-face with layer (f), as the skin layer.

Said layer (g) will comprise a polymer which may suitably be selected from ethylene-vinyl acetate copolymers, ethylene-alkyl acrylate copolymers, ethylene-acrylic or methacrylic acid copolymers either in free acid or ionized form, heterogeneous ethylene-α-olefin copolymers, such as LLDPE or VLDPE, homogeneous ethylene-α-olefin copolymers, polyesters and polyamides.

The inner layer (f) may suitably comprise a polymer selected from ethylene-vinyl acetate copolymers, ethylene-alkyl acrylate copolymers, ethylene-acrylic or methacrylic acid copolymers either in free acid or ionized form, heterogeneous ethylene-α-olefin copolymers, such as LLDPE or VLDPE, and homogeneous ethylene-α-olefin copolymers. When the outer layer (g) comprises a co-polyester or a polyamide, layer (f) will preferably comprise a modified polyolefin to tie layer (d) to layer (g).

In case of barrier structures said layer (f) may represent a PVDC layer and the skin layer (g) may comprise any of the resins or resin blends indicated above that might be bonded directly to the PVDC layer, such as for instance an ethylene-vinyl acetate copolymer.

A still further preferred embodiment of the present invention comprises a structure containing at least seven layers wherein three additional layers (h), (l) and (j) follow layer (d) in the structure: layer (h) being in contact face-to-face with layer (d), layer (j) being the outer skin layer and layer (l) being an inner layer positioned between layer (h) and layer (j).

In this specific embodiment, layer (j) is defined as layer (g) above, layer (l) is defined as layer (f) above, while layer (h) will comprise a polymer which may suitably be selected from ethylene-vinyl acetate copolymers, ethylene-alkyl acrylate copolymers, ethylene-acrylic or methacrylic acid copolymers either in free acid or in ionized form, heterogeneous ethylene-alpha-olefin copolymers, such as LLDPE or VLDPE, homogeneous ethylene-alpha-olefin copolymers, and blends thereof.

In a preferred embodiment such a structure containing at least seven layers will comprise a layer (h) of an ethylene-vinyl acetate copolymer, a layer (l) of a polymer selected from an ethylene-acrylic or methacrylic acid copolymer either in free acid or ionized form, or a heterogeneous or homogeneous ethylene-alpha-olefin copolymer, and a layer (j) of an ethylene-vinyl acetate copolymer.

In such a case, preferably, the ethylene-vinyl acetate copolymer of layers (h) and (j) will contain from 9 to 19% by weight of vinyl acetate units; more preferably from 11 to 15%; still more preferably, from 12 to 14%. Preferably, the ethylene-vinyl acetate copolymer of layers (h) and/or (j) has a melt index <0.5 and preferably ≦0.35.

Alternatively the ethylene-vinyl acetate copolymers of layers (h) and/or (j) can be replaced by ethylene alkyl acrylate copolymers (e.g. ethylene-methyl acrylate and ethylene-butyl acrylate) with an alkyl acrylate content of from 14 to 19% by weight.

In case of a barrier structure, layer (h) may be PVDC, layer (i) may comprise a resin as defined above which might be bonded directly to the PVDC layer or it may comprise a modified polyolefin to aid adhesion between the PVDC layer and the outer skin layer (j).

Alternatively, the barrier layer of PVDC may represent layer (i) in the overall structure and layer (h) and layer (j) would comprise polymers or polymer blends which may be bonded directly to the PVDC layer.

Still alternatively, layer (h) may comprise an ethylene-vinyl acetate copolymer or, preferably, a modified polyolefin to provide adhesion between layer (d) and layer (i) which will comprise EVOH, polyamide, or a blend of EVOH and polyamide, and layer k) will comprise an ethylene-vinyl acetate copolymer, an ethylene-alkyl acrylate copolymer or a modified polyolefin.

In a preferred embodiment of the present invention the film comprising at least four layers (a) to (d) is partially or wholly cross-linked. To produce crosslinking, an extrudate is treated with a suitable radiation dosage of high energy electrons, preferably using an electron accelerator, with the dosage level being determined by standard dosimetry methods. Other accelerators such as a Van der Graaf generator or resonating transformer may be used. The radiation is not limited to electrons from an accelerator since any ionizing radiation may be used. Radiation dosages are referred to herein in terms of megarad (MRad). A MRad is $10^6$ Rad with a Rad being the quantity of irradiation that results in the absorption of 100 ergs of energy per gram of irradiated material regardless of the source of radiation. A suitable radiation dosage of high energy electrons is up to about 14 MRad, more preferably in the range of from 2 to 12 and even more preferably in the range of from 4 to 9 MRad.

Irradiation is most preferably performed prior to orientation but it could also be performed after orientation.

The overall thickness of the films according to the present invention can vary from about 15 to about 150μ. Preferably however the thickness thereof will be in the range 30 to 130 and more preferably in the range 50 to 110μ.

The thickness of the heat-sealing layer (a) as well as that of layers (b), (c), and (d) will depend on the overall thickness of the end structure. For the most preferred overall thickness range of from 50 to 110μ, the thickness of the heat-sealing layer is generally equal to or higher than 6μ, typically comprised between about 6 and about 30μ, and preferably between about 8 and about 20μ and that of layers (b), (c), and (d) is generally higher than 5μ, preferably higher than 8 μ and even more preferably higher than 10μ. Thinner films will clearly have thinner partial thicknesses of the layers.

The films according to the present invention can be manufactured by the so-called trapped-bubble process, which is a known process typically used for the manufacture of heat-shrinkable films to be used for food contact packaging.

According to said process, the multilayer film is co-extruded through a round die to obtain a tube of molten polymer which is quenched immediately after extrusion without being expanded, optionally cross-linked, then heated to a temperature which is below the melting temperature of at least one of the resins employed, typically by passing it through a hot water bath, and expanded, still at this temperature by internal air pressure to get the transversal orientation and by a differential speed of the pinch rolls which hold the thus obtained "trapped bubble" to provide the longitudinal orientation. The film is then rapidly cooled to somehow freeze the molecules of the film in their oriented state and wound.

Depending on the number of layers in the structure it may be advisable or necessary to split the co-extrusion step: a tube will first be formed of a limited number of layers, with layer (a) on the inside of the tube; this tube will be quenched quickly and before submitting it to the orientation step it will be extrusion-coated with the remaining layers, again quenched quickly, optionally cross-linked, and then passed to the orientation. During the extrusion-coating the tube will be slightly inflated just to keep it in the form of a tube and avoid that it collapses.

The coating step can be simultaneous, by coextruding all the remaining layers altogether, so as to simultaneously adhere all of them, one over the other, to the quenched tube obtained in the first coextrusion step, or this coating step can be repeated as many times as the layers which are to be added.

The extrusion-coating step is clearly also required when a film only partially cross-linked is desired such as in the case of barrier structures comprising a PVDC layer which may be damaged by irradiation. In this case the irradiation step will be performed after the first extrusion (which would not comprise the PVDC barrier layer) and before the extrusion-coating.

The film of the present invention may be used either as a film or as a bag to form a package in a conventional manner. In a preferred embodiment the film is obtained as a tubular film and bags are formed by transverse sealing and cutting across the flattened tubular film to make individual bags. Alternatively bags can be made by slitting the tubular film along one edge and then transversely sealing and severing the film to produce bags. Other methods of making bags and packages are known and may be readily adapted to use with the multilayer films of the invention.

A package or bag formed from a film according to the present invention may be used for packaging food and non-food articles. In view of the outstanding mechanical, shrink and optical properties thereof, the films according to the present invention showed to be particularly suitable for packaging frozen meat, poultry, fish or lamb, or fresh products to be frozen.

The properties of the films according to the present invention have been evaluated by submitting the films to the tests indicated below.

Puncture resistance: the puncture resistance is the resistance force arising when pushing a punch against a surface of flexible film. There is not a standard test method to measure this attribute. The test method used in the present evaluations is described briefly herein below: a film sample (6.5 cm×6.5 cm) is fixed in a specimen holder connected to a compression cell (1–50 kg normal sensitivity) mounted on a dynamometer (an Instron tensile tester); when the dynamometer is started, a punch (a punching sphere, 5-mm in diameter, soldered on a plunger) is brought against the film sample at a constant speed (30 cm/min) and the force needed to puncture the sample is graphically recorded.

In-line abuse resistance: the capability of the tested structures to withstand without breakage the in-line packaging operations, i.e. loading, vacuumizing, sealing, shrinking, and collecting the products through an idle roll conveyor, is defined as "in-line abuse resistance". Scope of this test is to provide a method to discriminate and rank bags of different structure at a laboratory level as to this aspect. The procedure to test this property is therefore devised so as to simulate as much as possible the most drastic conditions which might actually occur in the packaging lines. To perform this test, the bags to be examined are filled with plastic blocks covered by net, vacuumized, sealed and shrunk on an industrial packaging line. The thus obtained packages are then checked for leakers and the in-line abuse resistance is evaluated by the % of rejects. Due to the harsh conditions purposely employed this number is typically high but, as indicated above, this test has not an absolute but only a relative meaning and its aim is to indicate whether a given structure is expected to have more or less abuse resistance of a standard bag used as comparison, when used at the customer plant.

Abuse resistance during shipping: this term defines the capability of a material to withstand without breakage the stresses which occur during the transportation of packed products. As for the in-line abuse resistance this test is aimed at discriminating and ranking bags under this aspect at a laboratory level. Therefore the operations that occur at customer level are reproduced under extremely severe conditions. To perform this test the bags to be examined are loaded with rubber blocks covered by net, vacuumized, sealed and shrunk, then placed into cartons and tested on a shipping simulator under standard conditions. Then the packages are checked for leakers and the abuse resistance during shipping is evaluated by the % of rejects. In the present case, since the films according to the present invention are particularly suitable for frozen food applications, the packages have been frozen before placing them into cartons.

% Unrestrained linear shrinkage: the percent free shrink, i.e. the irreversible and rapid reduction, as a percent, of the original dimensions of a sample subjected to a given temperature under conditions where nil restraint to inhibit shrinkage is present, has been measured according to ASTM D2732, by immersing for 4 seconds specimens of the structures to be tested (100 mm×100 mm) into a bath of hot water (90° C.). This attribute has been measured in the longitudinal direction (LS) as well as in the transversal direction (TS).

Haze: haze is defined as that percentage of transmitted light which in passing through the specimen deviates from the incident beam by forward scattering, and it has been measured by ASTM D 1003 (Procedure A).

Gloss: the specular gloss of the films, i.e. the relative luminous reflectance factor of a specimen in the mirror direction has been measured using ASTM 2457-90 with a gloss angle of 60°.

The present invention will now be described in more detail with particular reference to the following Examples:

EXAMPLE 1

A four layer structure is prepared by coextrusion of a heat sealable layer (a) of a heterogeneous ethylene-octene copolymer with d=0.911 g/cc and Melt Index of 6 g/10' (STAMYLEX™ 08-076 -DSM); DMS heterogeneous ethylene-octene copolymer an inner layer (b), in face-to face contact with the heat-sealing layer (a), of an ethylene-vinyl acetate copolymer with 13.0% by weight of vinyl acetate units and Melt Index of 0.25 g/10' (ESCORENE™ Ultra UL 00014 ethylene-vinyl acetate copolymer EXXON);

an inner layer (c), in face-to face contact with inner layer (b), of an ethylene-methacrylic acid copolymer with 12% by weight of methacrylic acid and Melt Index of 1.5 g/10' (NUCREL™ 1202 HC ethylene-methacrylic acid copolymer from DuPont); and an outer layer (d) in face-to-face contact with inner layer (c), of an ethylene-vinyl acetate copolymer with 13.0% by weight of vinyl acetate units and Melt Index of 0.25 g/10' (ESCORENE™ Ultra UL 00014 ethylene-vinyl acetate copolymer from Exxon).

The extruded tubular film is cooled quickly and collapsed.

This 4-layer structure is irradiated by high energy electrons at a dosage of 6.0 MRad to provide crosslinking and oriented biaxially in both machine (MD) and transverse (TD) directions by a factor of about 3 (TD) and about 3.5 (MD) by feeding it through a hot water bath (85–90° C.), inflating it to get the transversal orientation and stretching it to get the longitudinal orientation. The film is then rapidly cooled and rolled up for further processing.

The thickness of the layers in the final 4-layer structure is as follows:

Heat-sealable layer (a): $10\mu$

Inner layer (b): $21\mu$

Inner layer (c): $21\mu$

Outer layer (d): $21\mu$.

EXAMPLE 2

A 7-layer structure is prepared by coextrusion of the above 4-layer tube, irradiation at a dosage of 4.5 MRad, and extrusion-coating, on top of layer (d) with—from the inside to the outside:

an inner layer (h), in face-to face contact with inner layer (d), of an ethylene-vinyl acetate copolymer with 13.5% by weight of vinyl acetate units and Melt Index of 0.35 g/10' (EVATANE™ 1003 VN4 ethylene-vinyl acetate copolymer from Elf Atochem);

an inner layer (i), in face-to face contact with layer (h), of a heterogeneous ethylene-octene copolymer with d=9.02 g/cc and Melt Index of 3. 0 g/10' (TEAMEX™ 1000F heterogeneous ethylene-vinyl acetate copolymer from Elf Atochem); and an outer layer (j), in face-to face contact with layer (i), of an ethylene-vinyl acetate copolymer with 13.5% by weight of vinyl acetate units and Melt Index of 0.35 g/10' (TEAMEX™ 1000F heterogeneous ethylene-octene copolymer from DSM).

The tube is then rapidly cooled and oriented as indicated in Example 1.

The thickness of the different layers is as follows:

Heat-sealable layer (a): $10.3\mu$

Inner layer (b): $12.3\mu$

Inner layer (c): $13.4\mu$

Inner layer (d): $12.3\mu$

Inner layer (h): $8.2\mu$

Inner layer (i) $10.3\mu$

Outer layer (j): $8.2\mu$.

EXAMPLE 3

A 7-layer structure is prepared by coextrusion of the 4-layer tube described in Example 1, irradiation at a dosage of 6.0 MRad, and extrusion-coating, on top of layer (d) with:

an inner layer (h) of an ethylene-vinyl acetate copolymer with 13.5% by weight of vinyl acetate units and Melt Index of 0.35 g/10' (EVATANE™ 1003 VN4 ethylene-vinylacetate coplymer from Elf Atochem);

an inner layer (i) of an ionomer (ethylene-methacrylic copolymer wherein the neutralizing cation is sodium, having a density of 0.940 g/cc and Melt Index of 1.3 g/10') (SURLYN™ 1601 ionomer resin from DuPont); and an outer layer (j) of an ethylene-vinyl acetate copolymer with 13.5% by weight of vinyl acetate units and Melt Index of 0.35 g/10 (EVATANE™ 1003 VN4 ethylene-vinyl acetate copolymer from Elf Atochem).

The tube is then rapidly cooled and oriented as indicated in Example 1.

The thickness of the different layers is as follows:

Heat-sealable layer (a): 10.3µ
Inner layer (b): 12.3µ
Inner layer (c): 13.4µ
Inner layer (d): 12.3µ
Inner layer (h): 8.2µ
Inner layer (i): 10.3µ
Outer layer (j): 8.2µ.

EXAMPLE 4

A 7-layer structure is prepared by coextrusion of the 4-layer tube described in Example 1, irradiation at a dosage of 4.5 MRad, and extrusion-coating, on top of layer (d) with:

an inner layer (h) of an ethylene-vinyl acetate copolymer with 9% by weight of vinyl acetate units and Melt Index of 3.0 g/10' (EVATANE™ 1020 VN3 ethylene-vinyl acetate copolymer from Elf Atochem);

an inner layer (i) of an ionomer; (ethylene-methacrylic copolymer wherein the neutralizing cation is sodium, having a density of 0.940 g/cc and Melt Index of 1.3 g/10') (SURLYN™ 1601 ionomer resin from DuPont); and an outer layer (j) of an ethylene-vinyl acetate copolymer with 9% by weight of vinyl acetate units and Melt Index of 3.0 g/10' (EVATANE™ 1020 VN3 ethylene-vinyl acetate copolymer from Elf Atochem).

The tube is then rapidly cooled and oriented as indicated in Example 1.

The thickness of the different layers is as follows:

Heat-sealable layer (a): 10.3µ
Inner layer (b): 12.3µ
Inner layer (c): 13.4µ
Inner layer (d): 12.3µ
Inner layer (h): 8.2µ
Inner layer (i): 10.3µ
Outer layer (j): 8.2µ.

EXAMPLE 5

A 7-layer structure is prepared by coextrusion of a heat sealable layer (a) of a homogeneous ethylene-octene copolymer with d=0.902 g/cc and Melt Index of 3 g/10' (AFFINITY™ FW 1650 homogeneous ethylene-alpha-olefin from Dow);

an inner layer (b) of an ethylene-vinyl acetate copolymer with 13.0% by weight of vinyl acetate units and Melt Index of 0.25 g/10' (ESCORENE Ultra UL 00014 ethylene-vinyl acetate copolymer from EXXON);

an inner layer (c) of an ethylene-methacrylic acid copolymer with 12% by weight of methacrylic acid and Melt Index of 1.5 g/10' (NUCREL™ 1202 HC ethylene-methacrylic acid copolymer from DuPont); and a layer (d) of an ethylene-vinyl acetate copolymer with 13.0% by weight of vinyl acetate units and Melt Index of 0.25 g/10' (ESCORENE™ Ultra UL 00014 ethylene-vinyl acetate copolymer from EXXON).

The extruded tubular film is cooled quickly and collapsed.

This structure is then irradiated by high energy electrons at a dosage of 4.5 MRad to provide crosslinking and then extrusion-coated, on top of layer (d) above, with the following layers:

an inner layer (h) of an ethylene-vinyl acetate copolymer with 13.5% by weight of vinyl acetate units and Melt Index of 0.35 g/10' (EVATANE™ 1003 VN4 ethylene-vinyl acetate copolymer from Elf Atochem);

an inner layer (i) of an ethylene-methacrylic acid copolymer with 12% by weight of methacrylic acid and Melt Index of 1.5 g/10' (NUCREL™ 1202 HC ethylene-methacrylic acid copolymer from DuPont); and an outer layer (j) of an ethylene-vinyl acetate copolymer with 13.5% by weight of vinyl acetate units and Melt Index of 0.35 g/10' (EVATANE™ 1003 VN4 ethylene-vinyl acetate copolymer form Elf Atochem).

The film is oriented biaxially in both machine (MD) and transverse (TD) directions by a factor of about 3 (TD) and about 3.5 (MD) by feeding it through a hot water bath (85–90° C.), inflating it to get the transversal orientation and stretching it to get the longitudinal orientation. The film is then rapidly cooled and rolled up for further processing.

The thickness of the layers in the final 7-layer structure is as follows:

Heat-sealable layer (a) 9.6µ
Inner layer (b): 11.5µ
Inner layer (c):12.5µ
Inner layer (d): 11.5µ
Inner layer (h): 7.6µ
Inner layer (i): 99.6µ
Outer layer (j): 7.6µ.

EXAMPLE 6

A 7-layer structure is obtained by following the same procedure as in Example 3 but avoiding the irradiation step.

EXAMPLE 7

A 7-layer structure is obtained by following the same procedure as in Example 3 but irradiating the substrate (a) to (d) to a dosage of 4.5 MRad instead of 6.

EXAMPLE 8

A 7-layer structure is obtained by following the same procedure as in Example 3 but irradiating the substrate (a) to (d) to a dosage of 7.5 MRad instead of 6.

EXAMPLE 9

A 7-layer structure is prepared by coextrusion of the 4-layer tube described in Example 1, irradiation at a dosage of 6.0 MRad, and extrusion-coating, on top of layer (d) with:

an inner layer (h) of an ethylene-vinyl acetate copolymer with 9% by weight of vinyl acetate units and Melt Index of 3.0 g/10'(EVATANE™ 1020 VN3 ethylene-vinyl acetate copolymer from Elf Atochem);

an inner layer (i) of an ionomer (ethylene-methacrylic copolymer wherein the neutralizing cation is sodium, having a density of 0.940 g/cc and Melt Index of 1.3 g/10') (SURLYN™ 1601 ionomer resin from Du Pont); and an outer layer (j) of an ethylene-vinyl acetate copolymer with 9% by weight of vinyl acetate units and Melt Index of 3.0 g/10' (EVATANE™ 1020 VN3 ethylene-vinyl acetate copolymer from Elf Atochem).

The tube is then rapidly cooled and oriented as indicated in Example 1.

The thickness of the different layers is as follows:

Heat-sealable layer (a): 10.3μ
Inner layer (b): 12.3μ
Inner layer (c): 13.4μ
Inner layer (d): 12.3μ
Inner layer (h): 8.2μ
Inner layer (i): 10.3μ
Outer layer (j): 8.2μ.

EXAMPLE 10

A 7-layer structure is prepared by coextrusion of the 4-layer tube described in Example 1, irradiation at a dosage of 6.0 MRad, and extrusion-coating, on top of layer (d) with:

a barrier layer (h) of PVDC;

an inner layer (i) of a heterogeneous ethylene-octene copolymer with d=0.902 g/cc and Melt Index of 3.0 g/10' (TEAMEX™ 1000F heterogeneous ethylene-octene copolymer from DSM); and an outer layer (j) of an ethylene-vinyl acetate copolymer with 9% by weight of vinyl acetate units and Melt Index of 3.0 g/10' (EVATANE™ 1020 VN3 ethylene-vinyl acetate copolymer from Elf Atochem).

The tube is then rapidly cooled and oriented as indicated in Example 1.

The thickness of the different layers is as follows:

Heat-sealable layer (a): 10.3μ
Inner layer (b): 12.3μ
Inner layer (c): 13.4μ
Inner layer (d): 12.3μ
Barrier layer (h): 5.0μ
Inner layer (i): 10.3μ
Outer layer (j): 8.2μ.

EXAMPLE 11

A 7-layer structure is obtained by following the same procedure as in Example 5 but using for the heat-sealing layer (a) a homogeneous ethylene-octene copolymer with d=0.895 g/cc and Melt Index of 1.6 g/10' (AFFINITY™ PF 140 homogeneous ethylene-octene copolymer Dow).

EXAMPLE 12

A 7-layer structure is prepared by coextrusion of the 4-layer tube described in Example 1, irradiation at a dosage of 4.5 MRad, and extrusion-coating, on top of layer (d) with:

an inner layer (h) of an ethylene-vinyl acetate copolymer with 13.5% by weight of vinyl acetate units and Melt Index of 0.35 g/10' (EVATANE™ 1003 VN4 ethylene-vinyl acetate copolymer form Elf Atochem);

an inner layer (i) of an ethylene-methacrylic acid copolymer with 12% by weight of methacrylic acid and Melt Index of 1.5 g/10' (NUCREL™ 1202 HC ethylene-methacrylicacid copolymer from DuPont); and an outer layer (j) of an ethylene-vinyl acetate copolymer with 13.5% by weight of vinyl acetate units and Melt Index of 0.35 g/10' (EVATANE™ 1003 VN4 ethylene-vinyl acetate copolymer from Elf Atochem).

The film is oriented biaxially in both machine (MD) and transverse (TD) directions by a factor of about 3 (TD) and about 3.5 (MD) by feeding it through a hot water bath (85–90° C.), inflating it to get the transversal orientation and stretching it to get the longitudinal orientation. The film is then rapidly cooled and rolled up for further processing.

The thickness of the layers in the final 7-layer structure is as follows:

Heat-sealable layer (a): 9.6μ
Inner layer (b): 11.5μ
Inner layer (c): 12.5μ
Inner layer (d): 11.5μ
Inner layer (h): 15.3μ
Inner layer (i): 6.7μ
Outer layer (j): 2.9μ.

EXAMPLE 13

A 7-layer structure is prepared by coextrusion of the 4-layer tube described in Example 1, irradiation at a dosage of 4.5 MRad, and extrusion-coating, on top of layer (d) with:

an inner layer (h) of an ethylene-vinyl acetate copolymer with 13.5% by weight of vinyl acetate units and Melt Index of 0.35 g/10' (EVATANE™ 1003 ethylene-vinyl acetate copolymer from VN4 Elf Atochem);

an inner layer (i) of an ethylene-methacrylic acid copolymer with 12% by weight of methacrylic acid and Melt Index of 1.5 g/10' (NUCREL™ 1202 HC ethylene-methacylic acid copolymer from DuPont); and an outer layer (j) of an ethylene-vinyl acetate copolymer with 9% by weight of vinyl acetate units (EVATANE™ 1020 VG3 ethylene-vinyl acetate copolymer from Elf Atochem).

The film is oriented biaxially in both machine (MD) and transverse (TD) directions by a factor of about 3 (TD) and about 3.5 (MD) by feeding it through a hot water bath (85–90° C.), inflating it to get the transversal orientation and stretching it to get the longitudinal orientation. The film is then rapidly cooled and rolled up for further processing.

The thickness of the layers in the final 7-layer structure is as follows:

Heat-sealable layer (a): 9.6μ
Inner layer (b): 11.5μ
Inner layer (c): 12.5μ
Inner layer (d): 11.5μ
Inner layer (h): 12.4μ
Inner layer (i): 10.0μ
Outer layer (k): 2.9μ

EXAMPLE 14

A 9-layer structure is prepared by coextrusion of the 4-layer tube described in Example 1, irradiation at a dosage of 4.5 MRad, and extrusion-coating, on top of layer (d) with—in sequence from the inside to the outside-:

an inner layer (k) of an ethylene-vinyl acetate copolymer with 9% by weight of vinyl acetate units and Melt Index of 3.0 g/10' (EVATANE™ 1020 VN3 ethylene-vinyl acetate copolymer from Elf Atochem)

an inner layer (l) of an ethylene-based adhesive from (BYNEL™ CXA 3062 ethylene-based adhesive form DuPont);

an inner layer (m) of a terpolyamide (GRILON™ XE 3534 from EMS);

an inner layer (n) of an ethylene-based adhesive (BYNEL™ CXA 3062 ethylene-based adhesive from DuPont) and an outer layer (o) of an ethylene-vinyl acetate copolymer with 9% by weight of vinyl acetate units and Melt Index of 3.0 g/10' (EVATANE™ 1020 VN3 ethylene-vinyl acetate copolymer from Elf Atochem).

The film is oriented biaxially in both machine (MD) and transverse (TD) directions by a factor of about 3 (TD) and about 3.5 (MD) by feeding it through a hot water bath (85–90° C.), inflating it to get the transversal orientation and stretching it to get the longitudinal orientation. The film is then rapidly cooled and rolled up for further processing.

The thickness of the layers in the final 9-layer structure is as follows:

Heat-sealable layer (a): $10\mu$

Inner layer (b): $6\mu$

Inner layer (c): $5\mu$

Inner layer (d): $6\mu$

Inner layer (k): $4\mu$

Inner layer (l): $4\mu$

Inner layer (m): $10\mu$

Inner layer (n): $4\mu$

Outer layer (o): $4\mu$.

EXAMPLE 15

A 7-layer structure is prepared by coextrusion of a heat selable layer (a) of a heterogeneous ethylene-octene copolymer with d=0.911 g/cc and Melt Index of 6 g/10' (STAMYLEX™ 08-076 heterogeneous ethylene-octene copolymer DSM);

an inner layer (b) of an ethylene-vinyl acetate copolymer with 13.0% by weight of vinyl acetate units and Melt Index of 0.25 g/10' (ESCORENE™ Ultra UL 00014 ethylene-vinyl acetate copolymer from EXXON);

an inner layer (c) of a homogeneous (single-site) ethylene-octene copolymer with d=0.908 g/cc and Melt Index of 1.0 g/10' (AFFINITY™ PF 1840 homogeneous ethylene-octene copolymer from Dow); and a layer (d) of an ethylene-vinyl acetate copolymer with 13.0% by weight of vinyl acetate units and Melt Index of 0.25 g/10' (ESCORENE™ Ultra UL 00014 ethylene-vinyl acetate copolymer from EXXON).

The extruded tubular film is cooled quickly and collapsed. This structure is then irradiated by high energy electrons at a dosage of 4.5 MRad to provide crosslinking and then extrusion-coated, on top of layer (d) above, with the following layers:

an inner layer (h) of an ethylene-vinyl acetate copolymer with 13.5% by weight of vinyl acetate units and Melt Index of 0.35 g/10' (EVATANE™ 1003 VN4 ethylene-vinyl acetate copolymer from Elf Atochem);

an inner layer (i) of an ionomer; (ethylene-methacrylic copolymer wherein the neutralizing cation is sodium, having a density of 0.940 g/cc and Melt Index of 1.3 g/10') (SURLYN™ 1601 ionomer resin from Du Pont); and an outer layer (j) of an ethylene-vinyl acetate copolymer with 13.5% by weight of vinyl acetate units and Melt Index of 0.35 g/10' (EVATANE™ 1003 VN4 ethylene-vinyl acetate copolymer from Elf Atochem)

The film is oriented biaxially in both machine (MD) and transverse (TD) directions by a factor of about 3 (TD) and about 3.5 (MD) by feeding it through a hot water bath (85–90° C.), inflating it to get the transversal orientation and stretching it to get the longitudinal orientation. The film is then rapidly cooled and rolled up for further processing.

The thickness of the layers in the final 7-layer structure is as follows:

Heat-selable layer (a): $10.3\mu$

Inner layer (b): $12.3\mu$

Inner layer (c): $13.4\mu$

Inner layer (d): $12.3\mu$

Inner layer (h): $8.2\mu$

Inner layer (i): $10.3\mu$

Outer layer (j): $8.2\mu$

EXAMPLE 16

A 9-layer structure is prepared by coextrusion of the 4-layer tube described in Example 1, irradiation at a dosage of 3.5 MRad, and extrusion-coating, on top of layer (d) with—from the inside to the outside-:

an inner layer (k) of an ethylene-vinyl acetate copolymer with 9% by weight of vinyl acetate units and Melt Index of 3.0 g/10' (EVATANE™ 1020 VN3 Ethylene-vinyl acetate copolymer from Elf Atochem)

an inner layer (l) of an ethylene-based adhesive (ADMER™ NF 530 ethylene-based ashesive from Mitsui);

an inner layer (m) of an ethylene-vinyl alchool copolymer with an ethylene content of 44% by mole (EVAL EP-E105A—Marubeni);

an inner layer (n) of an ethylene-based adhesive (ADMER™ NF 530 ethylene-vinyl acetate copolymer from Mitsui) and an outer layer (o) of an ethylene-vinyl acetate copolymer with 9% by weight of vinyl acetate units and Melt Index of 3.0 g/10' (EVATANE™ 1020 VN3 ethylene-vinyl acetate copolymer from Elf Atochem).

The film is oriented biaxially in both machine (MD) and transverse (TD) directions by feeding it through a hot water bath (90–93° C.), inflating it to get the transversal orientation and stretching it to get the longitudinal orientation.

The film is then rapidly cooled and rolled up for further processing.

The thickness of the layers in the final 9-layer structure is as follows:

Heat-sealable layer (a): $10\mu$

Inner layer (b): $6\mu$

Inner layer (c): $5\mu$

Inner layer (d): $6\mu$

Inner layer (k): $6\mu$

Inner layer (l): $4\mu$

Inner layer (m): $5\mu$.

Inner layer (n): $4\mu$

Outer layer (o): $6\mu$.

EXAMPLE 17

A 7-layer structure is obtained by following the same procedure as in Example 2 but replacing the ethylene-vinyl acetate of layers (b) and (d) with an ethylene-butyl acrylate copolymer with 18.5% by weight of butyl acrylate units and Melt Index of 0.35 g/10' (EA 719-009 ethylene-butyl acrylate copolymer from Quantum USI).

EXAMPLE 18

A 7-layer structure is obtained by following the same procedure as in Example 2 but replacing the ethylene-vinyl acetate of layers (b) and (d) with an ethylene-methyl acrylate copolymer with 24% by weight of methyl acrylate units and Melt Index of 0.4–0.6 g/10' (LOTRYL™ 24MA005 ethylene-vinyl acetate copolymer from Elf Atochem).

EXAMPLE 19

A 7-layer structure is obtained by following the same procedure as in Example 2 but replacing the ethylene-vinyl acetate of layer (b) with an ethylene-butyl acrylate copolymer with 18.5% by weight of butyl acrylate units and Melt Index of 0.35 g/10' (EA 719–009 ethylene-butyl acrylate copolymer from Quantum USI).

EXAMPLE 20

A 6-layer structure is prepared by coextrusion of the 4-layer tube of Example 1, irradiation at a dosage of 4.5 MRad, and extrusion-coating, on top of layer (d) with:

an inner layer (f) of an ethylene-vinyl acetate copolymer with 13.5% by weight of vinyl acetate units and Melt Index of 0.35 g/10' (EVATANE™ 1003 VN4 ethylene-vinyl acetate copolymer from Elf Atochem), and an outer layer (g) of a heterogeneous ethylene-octene copolymer with d=0.911 g/cc and Melt Index of 6 g/10' (STAMYLEX 08-076 heterogeneous ethylene-octene copolymer from DSM).

The tube is then rapidly cooled and oriented as indicated in Example 1.

The thickness of the different layers is as follows:

Heat-sealable layer (a): 10.3μ

Inner layer (b): 12.3μ

Inner layer (c): 13.4μ

Inner layer (d): 12.3μ

Inner layer (f): 14.3μ

Outer layer (g): 10.3μ

EXAMPLE 21

A 5-layer structure is prepared by coextrusion of the 4-layer tube of Example 1, irradiation at a dosage of 4.5 MRad, and extrusion-coating, on top of layer (d) with:

an outer layer (e) of a homogeneous ethylene-octene copolymer with d=0.902 g/cc and Melt Index of 3.0 g/10' (AFFINITY™ FW 1650 homogeneous ethylene-octene copolymer from Dow)

The tube is then rapidly cooled and oriented as indicated in Example 1.

The thickness of the different layers is as follows:

Heat-sealable layer (a): 10.3μ

Inner layer (b): 12.3μ

Inner layer (c): 13.4μ

Inner layer (d): 12.3μ

Outer layer (e): 25.3μ.

The properties (% Shrink, Haze, Gloss, Puncture resistance, In-line abuse resistance) of some representative structures of the present invention are reported in Table I.

In the same Table for comparative purposes the results obtained with a mono-layer, 80 μ thick, film of ionomer (actually marketed by Trigon as TRIGON™ TN for frozen food packaging and considered as the leading product on this market) are also reported under the heading "Comp. A".

The bags used for the in-line abuse resistance tests were 165 mm×280 mm end sealed bags.

TABLE I

| | Structure of Example no. | | | | | | | | |
|---|---|---|---|---|---|---|---|---|---|
| | 1 | 2 | 3 | 5 | 6 | 7 | 8 | 12 | Comp. A |
| % Shrink | | | | | | | | | |
| LS | ND | 53 | 54 | 43 | ND | ND | ND | 43 | 56 |
| TS | ND | 60 | 61 | 54 | ND | ND | ND | 55 | 55 |
| Haze | ND | 4.5 | 4.6 | 4.0 | ND | ND | ND | 5.7 | 7.2 |
| Gloss | ND | 111 | 113 | 112 | ND | ND | ND | 104 | 103 |
| Puncture (kg) | | | | | | | | | |
| 30° C. | 14.8 | 9.9 | 11.1 | 9.4 | 8.8 | 9.4 | 12.0 | 11.1 | 6.8 |
| 90° C. | 1.4 | 1.0 | 1.0 | 1.1 | 0.3 | 0.6 | 1.0 | 1.0 | 0.2 |
| In-line abuse | | | | | | | | | |
| % Rejects | 74 | 78 | 65 | 65 | 63 | ND | 72 | 59 | 96 |

ND = not determined

In following Table II the Abuse resistance during shipping of the structure of Example 3 in comparison with the bag indicated as "Comp. A" is reported:

TABLE II

| | Structure of Example 3 | Comp. A |
|---|---|---|
| Abuse resistance during shipping % Rejects | 71 | 85 |

What is claimed is:

1. A multilayer heat-shrinkable film, comprising:
    (A) a heat-sealable layer comprising single-site or metallocene catalyzed ethylene-alpha-olefin copolymer;
    (B) a first inner layer having a composition comprising at least one member selected from the group consisting of ethylene/vinyl acetate copolymer containing from 4 to 28 weight percent vinyl acetate units and having a melt index less than 1.0 g/10 minutes, and ethylene/alkyl acrylate copolymer containing from 9 to 28 weight percent alkyl acrylate units and having a melt index less than 1.0 g/10 minutes;
    (C) a second inner layer in fact-to-face contact with the first inner layer, wherein the second inner layer has a composition comprising at least one member selected from the group consisting of ethylene/acrylic acid copolymer in free acid form, ethylene/methacrylic acid copolymer in free acid form, and ethylene/alkyl acrylate copolymer; and (D) a fourth layer having a composition comprising at least one member selected from the group consisting of ethylene/vinyl acetate copolymer containing from 4 to 28 weight percent vinyl acetate units and having a melt index less than 1.0 g/10 minutes, and ethylene/alkyl acrylate copolymer containing from 9 to 28 weight percent alkyl acrylate units and having a melt index less than 1.0 g/10 minutes, wherein the fourth layer is in face-to-face contact with the second inner layer and is not in contact with the first inner layer;

wherein the composition of the second inner layer is different from the composition of the first inner layer and the fourth layer, and wherein a weight ratio of the first inner layer to the second inner layer, and the fourth layer to the second inner layer, are each from 1:8 to 8:1.

2. A multilayer heat-shrinkable film, comprising:

(A) a heat-sealable layer;

(B) a first inner layer comprising at least one member selected from the group consisting of ethylene/vinyl acetate copolymer containing from 4 to 28 weight percent vinyl acetate units and having a melt index less than 1.0 g/10 minutes, and ethylene/alkyl acrylate copolymer containing from 9 to 28 weight percent alkyl acrylate units and having a melt index less than 1.0 g/10 minutes;

(C) a second inner layer in face-to-face contact with the first inner layer, wherein the second inner layer comprises at least one member selected from the group consisting of ethylene/acrylic acid copolymer in free acid form and ethylene/methacrylic acid copolymer in free acid form; and (D) a fourth layer comprising at least one member selected from the group consisting of ethylene/vinyl acetate copolymer containing from 4 to 28 weight percent vinyl acetate units and having a melt index less than 1.0 g/10 minutes, and ethylene/alkyl acrylate copolymer containing from 9 to 28 weight percent alkyl acrylate units and having a melt index less than 1.0 g/10 minutes, wherein the fourth layer is in face-to-face contact with the second inner layer and is not in contact with the first inner layer; and wherein the composition of the second inner layer is different from the composition of the first inner layer and the fourth layer, and wherein a weight ratio of the first inner layer to the second inner layer, and the fourth layer to the second inner layer, are each from 1:8 to 8:1.

3. The multilayer heat-shrinkable film according to claim 1 or 2, wherein the first inner layer and the fourth layer each comprise ethylene/vinyl acetate copolymer having vinyl acetate units in an amount of from about 4 to 28 weight percent, the ethylene/vinyl acetate copolymer having a melt index of less than 1.0 g/10 minutes.

4. The multilayer heat-shrinkable film according to claim 3, wherein the first inner layer and the fourth layer each comprise ethylene/vinyl acetate copolymer having vinyl acetate units in an amount of from about 9 to 19 weight percent.

5. The multilayer film according to claim 3, wherein the heat-sealable layer comprises at least one member selected from the group consisting of heterogeneous ethylene/alpha-olefin copolymer, homogeneous ethylene/alpha-olefin copolymer, ethylene-propylene copolymer, ethylene/propylene/butylene copolymer, and copolymer of ethylene and acrylic or methacrylic acid including ionomer.

6. The multilayer film according to claim 1 or 2, wherein the weight ratios of the first inner layer and the second inner layer, and the second inner layer and the fourth layer, are each from 1:4 to 4:1.

7. The multilayer film according to claim 6, wherein the weight ratios are each from 1:2 to 2:1.

8. The multilayer film according to claim 3, wherein the first inner layer comprises ethylene/vinyl acetate copolymer containing from 11 to 15 weight percent vinyl acetate units, and the fourth layer comprises ethylene/vinyl acetate copolymer containing from 11 to 15 weight percent vinyl acetate units.

9. The multilayer film according to claim 3, wherein:
the ethylene/vinyl acetate copolymer of the first inner layer has a melt index of less than 0.5 g/10 minutes; and
the ethylene/vinyl acetate copolymer of the fourth layer has a melt index of less than 0.5 g/10 minutes.

10. The multilayer film according to claim 1 or 2, wherein the second inner layer comprises at least one member selected from the group consisting of ethylene/acrylic acid copolymer containing acrylic acid units in an amount of at least 8 weight percent, and ethylene/methacrylic acid copolymer containing methacrylic acid units in an amount of at least 8 weight percent.

11. The multilayer film according to claim 1 or 2, wherein the film is irradiated at a dosage of up to about 14 megarads.

12. The multilayer film according to claim 1 or 2, wherein the heat-sealable layer is in face-to-face contact with the first inner layer.

13. The multilayer film according to claim 1 or 2, wherein the film does not comprise an $O_2$-barrier comprising at least one member selected from the group consisting of polyvinylidene chloride, ethylene/vinyl alcohol copolymer, propylene/vinyl alcohol copolymer, and polyamide.

14. The multilayer film according to claim 1 or 2, further comprising a fifth layer, wherein the fifth layer is in face-to-face contact with the fourth layer and comprises at least one member selected from the group consisting of ethylene/vinyl acetate copolymer, ethylene/alkyl acrylate copolymer, ethylene/acrylic acid copolymer, ionomer of ethylene/acrylic acid copolymer, ethylene/methacrylic acid copolymer, ionomer of ethylene/methacrylic acid copolymer, heterogeneous ethylene/alpha-olefin copolymer, and homogeneous ethylene/alpha-olefin copolymer.

15. The multilayer film according to claim 1 or 2, further comprising a fifth layer and a sixth layer, wherein:
the fifth layer comprises at least one member selected from the group consisting of ethylene/vinyl acetate copolymer, ethylene/alkyl acrylate copolymer, ethylene/acrylic acid copolymer, ionomer of ethylene/acrylic acid copolymer, ethylene/methacrylic acid copolymer, ionomer of ethylene/methacrylic acid copolymer, heterogeneous ethylene/alpha-olefin copolymer, and homogeneous ethylene/alpha-olefin copolymer; and
the sixth layer is in face-to-face contact with the fifth layer and comprises at least one member selected from the group consisting of ethylene/vinyl acetate copolymer, ethylene/alkyl acrylate copolymer, ethylene/acrylic acid copolymer, ionomer of ethylene/acrylic acid copolymer, ethylene/methacrylic acid copolymer, ionomer of ethylene/methacrylic acid copolymer, heterogeneous ethylene/alpha-olefin copolymer, and homogeneous ethylene/alpha-olefin copolymer, polyester, and polyamide.

16. The multilayer film according to claim 1 or 2, further comprising a fifth layer, a sixth layer, and a seventh layer, wherein:

the fifth layer is in face-to-face contact with the fourth layer and is between the fourth layer and the sixth layer, and comprises at least one member selected from the group consisting of ethylene/vinyl acetate copolymer, ethylene/acrylic acid copolymer, ionomer of ethylene/ acrylic acid copolymer, ethylene/methacrylic acid copolymer, ionomer of ethylene/methacrylic acid copolymer, heterogeneous ethylene/alpha-olefin copolymer, and homogeneous ethylene/alpha-olefin copolymer;

the sixth layer is between the fifth layer and the sixth layer, and comprises at least one member selected from the group consisting of ethylene/vinyl acetate copolymer, ethylene/alkyl acrylate copolymer, ethylene/acrylic acid copolymer, ionomer of ethylene/ acrylic acid copolymer, ethylene/methacrylic acid copolymer, ionomer of ethylene/methacrylic acid copolymer, heterogeneous ethylene/alpha-olefin copolymer, and homogeneous ethylene/alpha-olefin copolymer;

the seventh layer is an outer skin layer and comprises at least one member selected from the group consisting of ethylene/vinyl acetate copolymer, ethylene/alkyl acrylate copolymer, ethylene/acrylic acid copolymer, ionomer of ethylene/acrylic acid copolymer, ethylene/ methacrylic acid copolymer, ionomer of ethylene/ methacrylic acid copolymer, heterogeneous ethylene/ alpha-olefin copolymer, homogeneous ethylene/alpha-olefin copolymer, polyester, and polyamide.

17. The multilayer film according to claim 16, wherein:

the fifth layer comprises ethylene/vinyl acetate copolymer;

the sixth layer comprises at least one member selected from the group consisting of ethylene/acrylic acid copolymer, ionomer of ethylene/acrylic acid copolymer, ethylene/methacrylic acid copolymer, ionomer of ethylene/methacrylic acid copolymer, heterogeneous ethylene/alpha-olefin copolymer, and homogeneous ethylene/alpha-olefin copolymer; and the seventh layer comprises ethylene/vinyl acetate copolymer.

18. The multilayer film according to claim 17, wherein the ethylene/vinyl acetate copolymer of the fifth layer and the seventh layer contains vinyl acetate units in an amount of from about 9 to 19 weight percent.

19. The multilayer film according to claim 17, wherein the ethylene/vinyl acetate copolymer of the fifth layer and the seventh layer have a melt index of less than 0.5 g/10 minutes.

20. The multilayer film according to claim 1 or 2, further comprising a fifth layer, a sixth layer. and a seventh layer, wherein the fifth layer is in face-to-face contact with the fourth layer, the sixth layer is between the fifth layer and the seventh layer, and the seventh layer is an outer film layer, wherein:

the fifth layer comprises polyvinylidene chloride;

the sixth layer comprises at least one member selected from the group consisting of ethylene/vinyl acetate copolymer, heterogeneous ethylenetalpha-olefin copolymer, and homogeneous ethylene/alpha-olefin copolymer; and the seventh layer comprises at least one member selected from the group consisting of ethylene/vinyl acetate copolymer, ethylene/alkyl acrylate copolymer, ethylene/acrylic acid copolymer, ionomer of ethylene/ acrylic acid copolymer, ethylene/methacrylic acid copolymer, ionomer of ethylene/methacrylic acid copolymer, heterogeneous ethylene/alpha-olefin copolymer, and homogeneous ethylene/alpha-olefin copolymer, polyester, and polyamide.

21. The multilayer film according to claim 20, wherein in the sixth and seventh layers, the ethylene/vinyl acetate copolymer has a melt index of less than 0.5 g/10 minutes.

* * * * *